United States Patent [19]

Yasumoto et al.

[11] Patent Number: 4,849,921

[45] Date of Patent: Jul. 18, 1989

[54] ARITHMETIC CIRCUIT FOR CALCULATING THE ABSOLUTE VALUE OF THE DIFFERENCE BETWEEN A PAIR OF INPUT SIGNALS

[75] Inventors: Masaaki Yasumoto; Tadayoshi Enomoto; Masakazu Yamashina, all of Tokyo, Japan

[73] Assignee: NEC Corporation, Tokyo, Japan

[21] Appl. No.: 876,026

[22] Filed: Jun. 19, 1986

[30] Foreign Application Priority Data

Jun. 19, 1985 [JP] Japan .................................. 60-133621
Jun. 25, 1985 [JP] Japan .................................. 60-138822
Nov. 28, 1985 [JP] Japan .................................. 60-268077

[51] Int. Cl.[4] .......................... G06F 7/38; G06F 7/50
[52] U.S. Cl. .................. 364/715.01; 364/768
[58] Field of Search ........... 364/736, 715.01, 768-769, 364/784-786, 715.04, 748; 340/146.2

[56] References Cited

U.S. PATENT DOCUMENTS 4,218,751 8/1980 McManigal ........................ 364/784
4,638,450 1/1987 Stoffers ................................ 364/715

FOREIGN PATENT DOCUMENTS 0072252 5/1980 Japan .................................... 364/768
0100224 6/1985 Japan .................................... 364/768

OTHER PUBLICATIONS

J. Earle et al., "Exponent Differences and Preshifter", IBM Technical Disclosure Bulletin, vol. 9, No. 7, Dec. 1966, pp. 848-849.

Primary Examiner—Gary V. Harkcom
Assistant Examiner—Long T. Nguyen
Attorney, Agent, or Firm—Sughrue, Mion, Zinn, Macpeak & Seas

[57] ABSTRACT

An arithmetic circuit has a first subtracter receiving first and second input signals which are composed of a plurality of bits and operative to output a first output signal representative of the first input signal minus the second input signal, and a second subtracter receiving the first and second input signals so as to output a second output signal representative of the second input signal minus the first input signal. A selector receives the first and second output signals and operates in response to one of the first and second output signals so as to alternately output the first and second output signals.

14 Claims, 8 Drawing Sheets

ARITHMETIC CIRCUIT FOR CALCULATING THE ABSOLUTE VALUE OF THE DIFFERENCE BETWEEN A PAIR OF INPUT SIGNALS

BACKGROUND OF THE INVENTION

1. Field of the Invention

The present invention relates to an arithmetic circuit for calculating the absolute value of the difference between a pair of input signals. More specifically, the present invention relates to a processor which can calculate the absolute difference between a pair of input digital signals at a high speed without needing additional elements.

2. Description of the Prior Art

One important operation in digital signal processings such as digital video signal processings and digital audio signal processings is to calculate the absolute value of the difference between a pair of digital signals. For example, in automatic equalizer system for removing transmission path distortion, if a so-called zero forcing algorithm is used, it is necessary to calculate the absolute value of the difference or error between an input signal and an output signal of the automatic equalizer and to introduce a weighting coefficient which will minimize the above absolute value of difference. In such a signal processing, a real time operation is required, and therefore, a high speed operation is very significant.

Heretofore, an arithmetic circuit for calculating the absolute value of the difference between a couple of input signals A and B, i.e., $|A-B|$ has included one subtracter receiving the two input signals A and B to output a difference $C=(A-B)$. Further, a sign inverting circuit is provided to receive the difference C so as to discriminate whether the sign of the difference C is positive (+) or negative (−). If the difference C is positive, the sign inverting circuit outputs the difference C without inversion as its output signal D. On the other hand, if the difference C is negative, the sign inverting circuit operates to invert the sign of the difference C. Namely, $-=(B-A)$ is outputted as the output D. Thus, the output D of the sign inverting circuit is indicative of $|A-B|$.

In the above arithmetic circuit, the sign inverting circuit is ordinarily constituted of another subtracter which executes the operation of (0–C) when the C is negative. Therefore, the arithmetic circuit is composed of two cascade-connected subtracters, and therefore, inevitably needs a long time of operation.

Further, the recent signal processing has been executed by using microcomputers, microprocessors, etc. In such a case, the above mentioned calculation for the absolute value of the difference is performed by means of an arithmetic and logic unit (abbreviated "ALU" hereinafter) which the most important part of microcomputers and microprocessors. The ALU is supplied with a couple of input signals in the form of two's complement, because the two's complement is easy to indicate the positive and the negative of numerical values in the arithmetic operation and also because it allows an adder and a subtracter to be formed by very similar circuits. Further, the ALU is operated by a control signal to selectively an arithmetic operation of the four fundamental rules and a logical operation. Namely, the ALU performs a selected one among addition, subtraction, multiplication, division, logical sum (OR), logical product (AND), exclusive OR, etc. However, the ALU does not have the function of absolute value calculation.

In the conventional signal processors using the microcomputer or the microprocessor, therefore, the output of the ALU is supplied to a sign inverting circuit. As mentioned hereinbefore, this sign inverting circuit is a subtracter, and therefore, the cascade of the ALU and the subtracter will also inevitably need a long time of operation for the absolute value of difference. Accordingly, this operation of the absolute value is one hindrance in the speed up of the digital signal processor intended to execute the real time signal processing of input signals.

As one measure for speeding up the signal processing, it is considered to apply a so-called pipeline architecture to the ALU and the associated sign inverting circuit. Namely, the ALU and the sign inverting circuit are driven with two different trains of clocks, respectively, so that the time of the absolute value calculation is determined by only the operation time of either the ALU or the sign inverting circuit (subtracter). As a consequence, the operation will be substantially speeded up. To the contrary, an external instruction will be divided into two instructions. This will result in increase of the number of required instructions and complication of instructions per se.

Furthermore, with the latest large-scaled inclination of microcomputers and microprocessors, there is increased the possibility of noises generating in wirings and elements of the circuit because of variation of the supply voltage and electrostatic coupling. The noises will be a cause for mulfunction of the circuit. Therefore, in order to find out and correct malfunction, there has been proposed and already actually reduced in practice to provide a sub-ALU and a comparator in addition to a main ALU, so that the two ALUs simultaneously executes the same operation, and the results of the operation are compared by the comparator. If the outputs of the two ALUs are not the same, the same operation is repeated until the outputs of the two ALUs become the same.

This arrangement can surely decrease the error of the operation, but although two ALUs and one comparator are provided, the function of the ALU itself is not expanded at all. Namely, the ALU per se cannot still perform the absolute value calculation of the difference.

SUMMARY OF THE INVENTION

Accordingly, it is an object of the present invention to provide an arithmetic circuit which can calculate the absolute value of a difference at a high speed.

Another object of the present invention is to provide an arithmetic circuit which can execute the operation for the absolute value of difference at substantial the same time as that for an ordinary difference.

Still another object of the present invention is to provide a digital signal processor which includes at least one ALU and which can perform the absolute value operation at a speed similar to that in operation for ordinary addition or subtraction.

A further object of the present invention is to provide a digital signal processor which includes at least one ALU and which can execute the absolute value operation at one instruction as in the case of an ordinary logical operation or arithmetic operation.

A still further object of the present invention is to provide a digital signal processor which includes a pair of ALUs for prevention of malfunction and which can perform the operation for the absolute value of difference by use of the pair of ALUs.

The above and other objects of the present invention are achieved in accordance with the present invention by an arithmetic circuit comprising first means receiving first and second input signals which are composed of a plurality of bits and operative to output a first output signal representative of the first input signal minus the second input signal, second means receiving the first and second input signals so as to output a second output signal representative of the second input signal minus the first input signal, and selection means receiving the first and second output signals and responsive to one of the first and second output signals so as to alternately output the first and second output signals.

In one embodiment of the arithmetic circuit, the first and second means are subtracters, respectively. In addition, the first and second input signals are representative of two's complements, respectively.

More specifically, the selection means is responsive to the first output signal so as to output the first output signal when the first output signal is positive and the second output signal when the first output signal is negative. In this case, preferably, the first and second means are subtracters, respectively, and the selection means is responsive to a borrow signal of the first subtracter.

In another embodiment of the arithmetic circuit, the first means is an arithmetic and logic circuit which receives the first and second input signals and which can execute an arithmetic and logical operation including a subtraction, and the second means is a subtracter. In this case, the selection means operates to output the output signal from the arithmetic and logic unit when it is in a normal arithmetic and logical operation and to alternatively output the output of the arithmetic and logic circuit and the output of the subtracter when the arithmetic and logic circuit is in the subtraction operation for calculation of the absolute value of the difference. Specifically, in the case of the operation for the absolute value of the difference, the selection means is responsive to the output signal of the arithmetic and logic circuit so as to output the output signal of the arithmetic and logic circuit when the output signal of the arithmetic and logic circuit is positive and the output signal of the subtracter when the output signal of the arithmetic and logic circuit is negative.

Furthermore, according to the present invention there is provided a digital signal processor comprising first and second arithmetic and logic circuits which receive first and second input signals composed of a plurality of bits, the first and second arithmetic and logic circuits being adapted to execute the same given operation in a first operation mode and to execute a first subtraction of the first input signal minus the second input signal and a second subtraction of the second input signal minus the first input signal, respectively in a second operation mode, a comparator receiving and comparing the outputs of the first and second arithmetic and logic circuits and operative in the first operation mode to generate, when both the outputs are not equal, an inconsistent signal which causes the first and second arithmetic and logic circuits to repeat the above same given operation until both the outputs are equal, and a selector circuit receiving the outputs of the first and second arithmetic and logic circuits and operative to output a given one of the outputs of the first and second arithmetic and logic circuits in the first operation mode, the selector circuit being operative in the second operation mode to output either of the outputs of the first and second arithmetic and logic circuit in accordance with a selected one of the outputs of the first and second arithmetic and logic circuit. Specifically, when the output of the first arithmetic and logic circuit is positive, the selector circuit outputs the output signal of the first arithmetic and logic circuit. When the output of the first arithmetic and logic circuit is negative, the selector circuit outputs the output signal of the second arithmetic and logic circuit.

The above and other objects, features and advantages of the present invention will be apparent from the following description of preferred embodiments of the invention with reference to the accompanying drawings.

DESCRIPTION OF THE PREFERRED EMBODIMENTS

Figure 1:
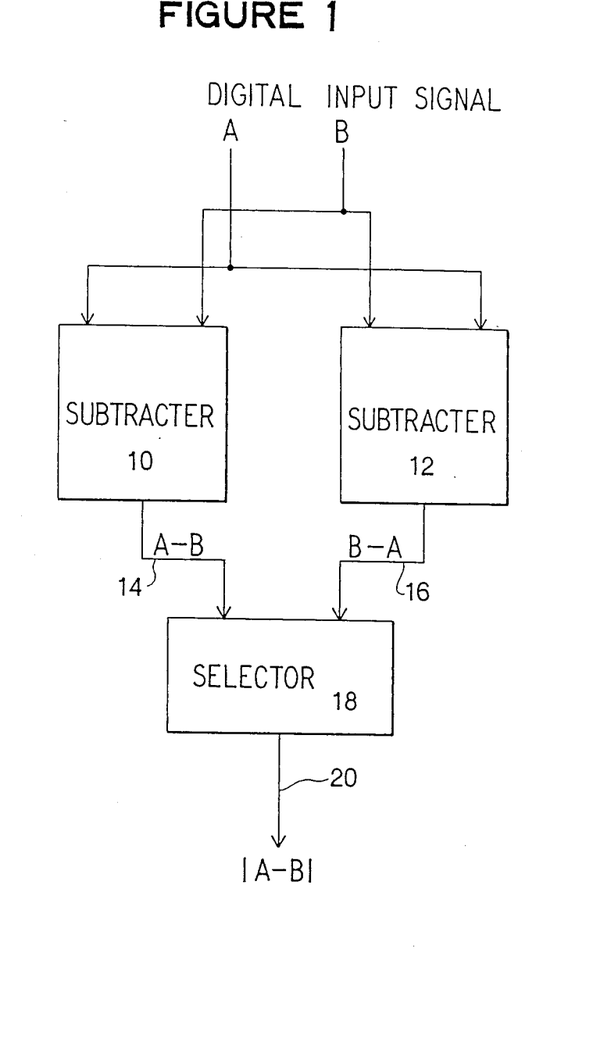
FIG. 1 is a block diagram showing a first embodiment of the arithmetic circuit in accordance with the present invention.

Referring to FIG. 1, a pair of input digital signals A and B in the form of two's complement are supplied to a first subtracter 10 which is adapted to execute the subtraction of A−B. At the same time, the input signals A and B are supplied to a second subtracter 12 adapted to perform the subtraction of B−A. The outputs of the two subtracters 10 and 12 are connected through signal buses 14 and 16, respectively, to a selector circuit 18. This selector circuit 18 operates to select, as the absolute value |A−B|, either the output (A−B) of the subtracter 10 or the output (B−A) of the subtracter 12 on the basis of one of the outputs of the subtracters 10 and 12, and then to output the selected output through an output bus 20.

Figure 2:
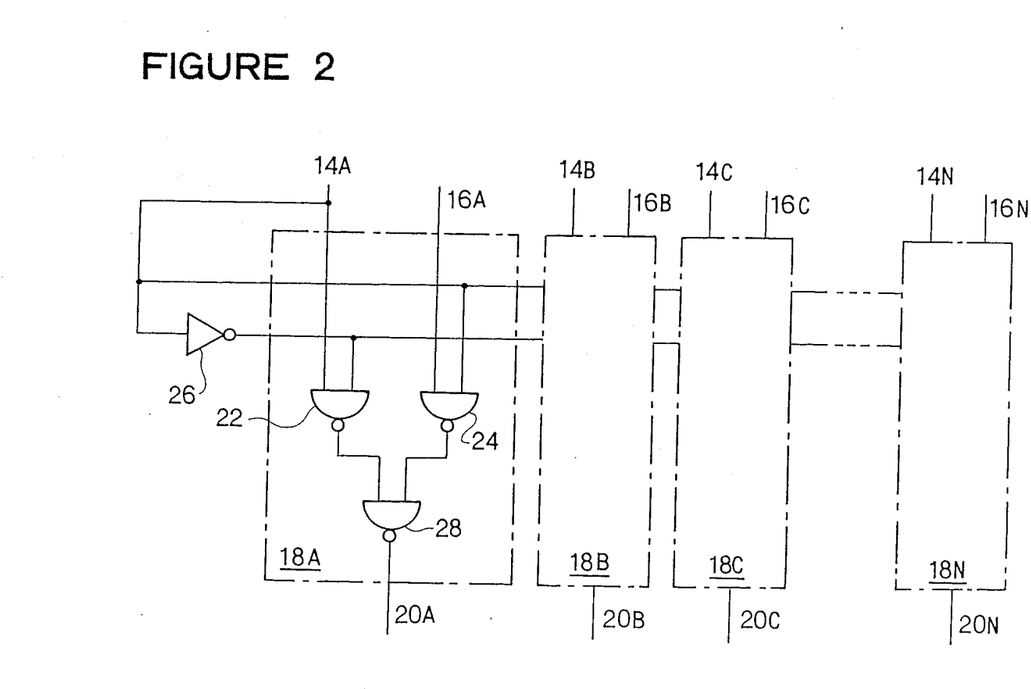
FIG. 2 is a circuit diagram showing the selector circuit incorporated in the arithmetic circuit shown in FIG. 1.

The selector circuit 18 can be constructed as shown in FIG. 2. If the digital signal is constituted of N bits, the selector circuit 18 comprises N one-bit selectors 18A–18N of the same construction. Therefore, the internal structure is shown on only the selector 18A for simplification of the drawing.

The selector 18A is connected at its one pair of signal inputs to respective most significant bit lines 14A and 16A of the signal buses 14 and 16 from the subtracters 10 and 12. The selectors 18B and 18C are connected to the second significant bit lines 14B and 16B and the third significant bit lines 14C and 16C. In such a manner, the final subtracter 18N is connected to the least significant bit lines 14N and 16N.

Each of the one-bit selectors 18A-18N includes a pair of NAND gates 22 and 24 which are connected at their one input to the signal input lines 14A-14N and 16A-16N. The other input of the NAND gate 22 is connected through an inverter 26 to the most significant bit line 14A of the output bus 14 of the subtracter 10, and the other input of the NAND gate 24 is connected directly to the most significant bit line 14A. The outputs of the NAND gates 22 and 24 are connected to two inputs of another NAND gate 28 whose output is connected to the corresponding bit line 20A-20N of the output bus 20.

A binary number represented in the form of two's complement is positive if its most significant bit is "0" and negative if its most significant bit is "1". Now, if the most significant bit line 14A is "0", the output of the NAND gate 24 is locked to "1" and on the other hand, the output of the inverter 26 becomes "1", so that the signals on the lines 14A-14N are passed through the NAND gates 22 and 28 to the output lines 20A-20N. Namely, when the value of A−B is positive, it is outputted as |A−B| from the output bus 20.

On the contrary, if a signal of "1" is outputted at the most significant bit line 14A, the output of the inverter 26 becomes "0", and so, the output of the NAND gate 22 is locked to "1". On the other hand, since the signal of "1" is supplied from the line 14A to the NAND gate 24, the signals on the lines 16A-16N are passed through the NAND gates 24 and 28 to the outputs lines 20A-20N. In other words, when the value of A−B is negative, the value of B−A is outputted as |A−B|.

As seen from the above, the arithmetic operations of (A−B) and (B−A) are executed in parallel by the two subtracters 10 and 12, and the selector circuit 18 has such a very simple construction that a signal passes through only two gates and the selection operation is controlled by the output itself of the subtracter 10. Therefore, the absolute value |A−B| can be obtained at substantially the same as the operation time of the subtracter.

The selector circuit 18 is not limited to the construction shown in FIG. 2 but can take various structures at the extent that the above mentioned selection operation can be performed. For example, the NAND gates 22 and 24 may controlled by the most significant bit line 16A of the output of the second subtracter 12.

Figure 3:
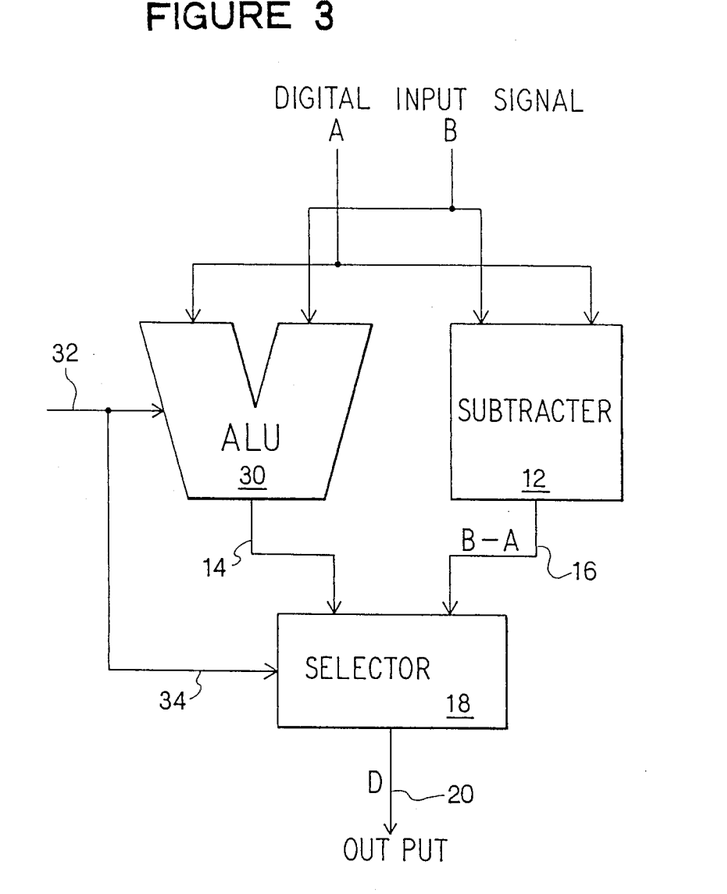
FIG. 3 is a diagram similar to FIG. 1 but showing a second embodiment of the arithmetic circuit.

Turning to FIG. 3, there is shown a second embodiment of the arithmetic circuit. In FIG. 3, elements similar to those shown in FIG. 1 are given the same Reference Numerals, and explanation thereon will be omitted.

As seen from comparison between FIGS. 1 and 3, the second embodiment comprises an arithmetic and logic unit or ALU 30 in place of the subtracter 10. This ALU 30 is controlled by an operation instruction signal on a line 32 to execute various arithmetic and logic operations including logical product (AND), logical sum (OR), exclusive OR, addition, and subtraction. A portion of the operation instruction signal 32 is supplied as a mode selection signal 34 to the selector circuit 18.

Figure 4:
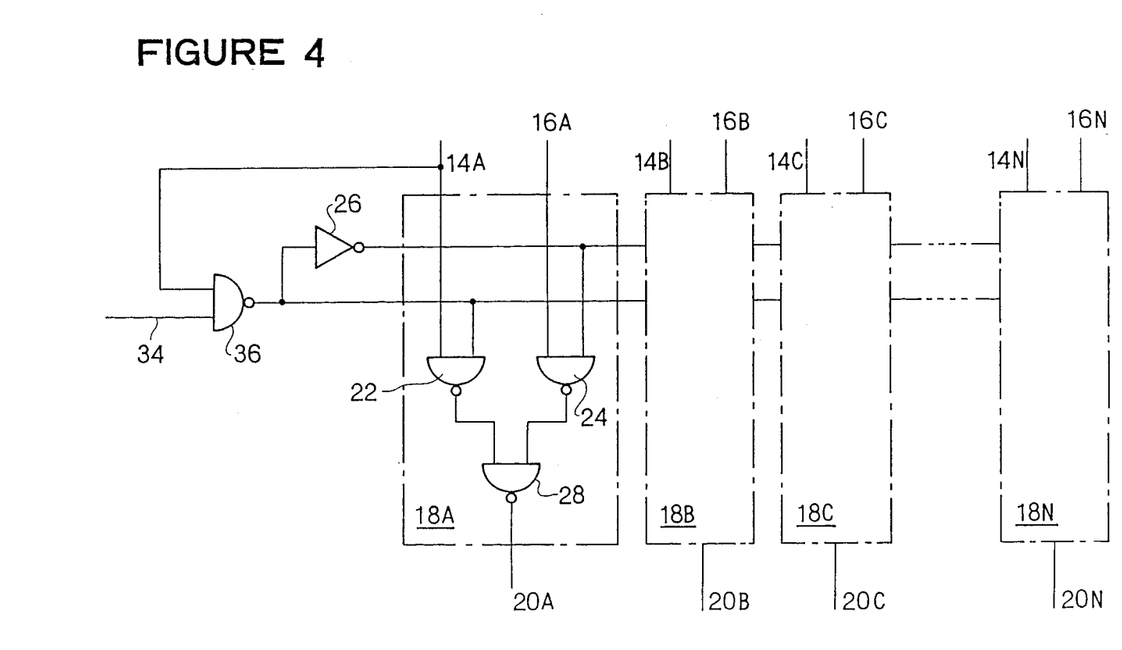
FIG. 4 is a diagram similar to FIG. 2 but showing the selector circuit incorporated in the arithmetic circuit shown in FIG. 3.

This selector circuit 18 is constructed as shown in FIG. 4. The circuit of FIG. 4 is the same as that of FIG. 2 excluding a NAND gate 36 which is connected at its two inputs to the most significant bit line 14A and the mode selection signal line 34 and is connected at its output to the inverter 26 and the NAND gate 22 of each one-bit selector 18A-18N.

In the arithmetic circuit shown in FIGS. 3 and 4, when the operation instruction signal 32 excluding the operation of the absolute value |A−B| is applied to the ALU 30 (this is a first operation mode), the mode selection signal 34 is maintained at "0". Accordingly, the output of the NAND gate 36 is fixed to "1", and therefore, the output of the NAND gate 24 is also locked to "1". As a result, the output of the ALU 30 is outputted through the selector circuit 18.

Thus, if the ALU 30 executes the operation of A−B in accordance with the operation instruction signal 32, the value of A−B is outputted from the selector circuit 18 as the output D (D=A−B). In addition, if the operation instruction signal 32 causes the ALU 30 to perform the calculation of A+B, the output D becomes A+B.

On the other hand, if the operation instruction signal 32 requests the operation of the absolute value |A−B| (this is a second operation mode), the ALU 30 is put in a condition of executing the subtraction of A−B, and the mode selection signal 34 is brought into "1". In this condition, therefore, the ALU 30 outputs the value of A−B to the selector circuit 18 and the subtracter 12 outputs the value B−A. On the other hand, in the circuit of FIG. 4, since the mode selection signal 34 is "1", the selection between the buses 14 and 16 is performed on the value of the most significant bit line 14A, similarly to the first embodiment shown in FIGS. 1 and 2.

Accordingly, the calculation of |A−B| can be executed at substantially the same time a the operation time of the ALU.

Figure 5:
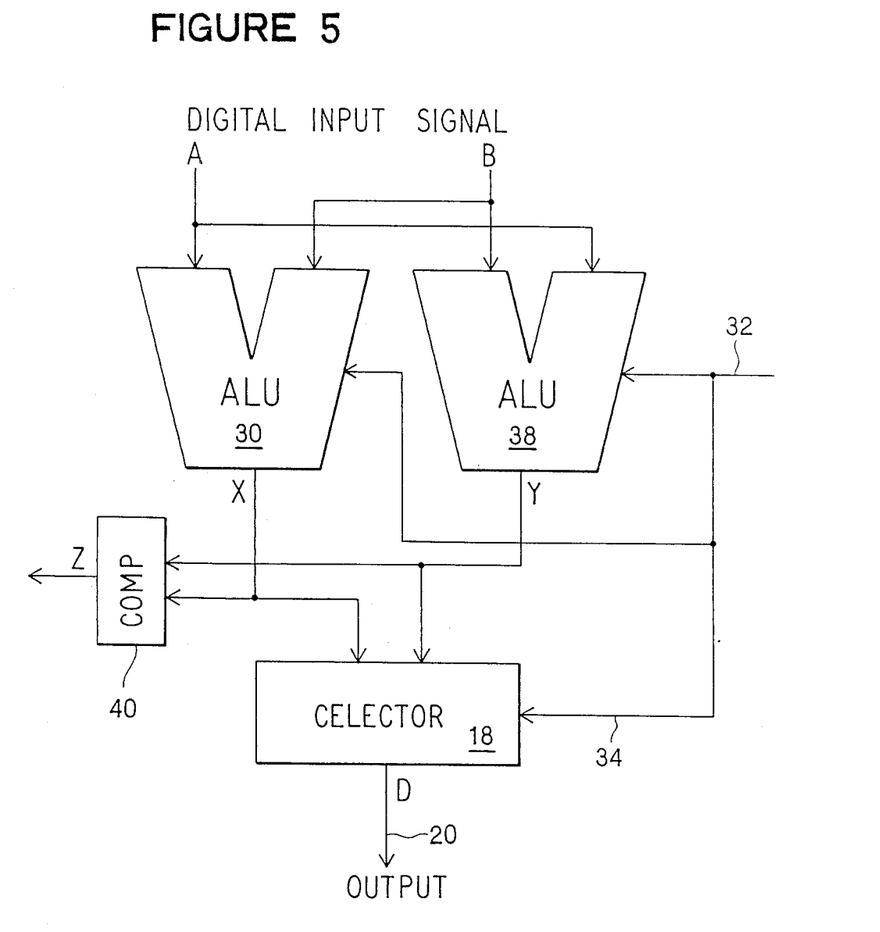
FIG. 5 is a diagram similar to FIG. 1 but showing a third embodiment of the arithmetic circuit.

Referring to FIG. 5, there is shown a arithmetic circuit in accordance with the present invention which is embodied in a double-ALU processor. Therefore, it can be said that the two subtracters 10 and 12 in the circuit of FIG. 1 are replaced by a main ALU 30 and a sub-ALU 38 and further a comparator 40 is provided. It can also be said that the subtracter 12 of the FIG. 3 circuit is replaced by the sub-ALU 38 and the comparator 40 is added. In any case, however, the main ALU 30, the sub-ALU 38 and the comparator 40 are the circuits which have already incorporated in the double-ALU processor.

Therefore, in the first operation mode mentioned in connection with the second embodiment, the ALUs 30 and 38 execute the same arithmetic or logic operation designated by the operation instruction signal 32, and the output of the main ALU 30 is passed through the selector circuit 18 to the output bus 20. In addition, the output X and Y of the ALUs 30 and 38 are supplied to the comparator 40. If X is not equal to Y, the comparator 40 generates an inconsistent signal Z which causes the ALUs 30 and 38 to repeat the same operation. Therefore, the same operation is repeatedly and simultaneously executed by the two ALUs 30 and 38 until X becomes equal to Y. As a result, if X is equal to Y, the comparator 40 generates a consistent signal which indicates that the output D of the selector circuit 18 is a correct solution of the designated arithmetic or logical operation for the input signals A and B.

In the second operation mode, the two ALUs 30 and 38 are so controlled that the main ALU 30 executes the operation of A−B and the sub-ALU 38 executes the operation of B−A, although both the two ALUs 30 and 38 execute the same operation of either A−B or B−A in the subtraction condition under the first operation mode. In this case, further, the mode selection signal 34 becomes "0", and therefore, the value of |A−B| is outputted from the selector circuit 18 to the output bus 20, similarly to the first and second embodiments shown FIGS. 1 to 4. Accordingly, the selector circuit 18 shown in FIG. 5 can be constructed to be the same as that shown in FIG. 4.

As seen from the above, the double-ALU processor can execute the operation of the absolute value |A−B| with one operation instruction at substantially the same speed as the one operation execution speed of one ALU and without adding further elements to the existing double-ALU processor.

Figure 6:
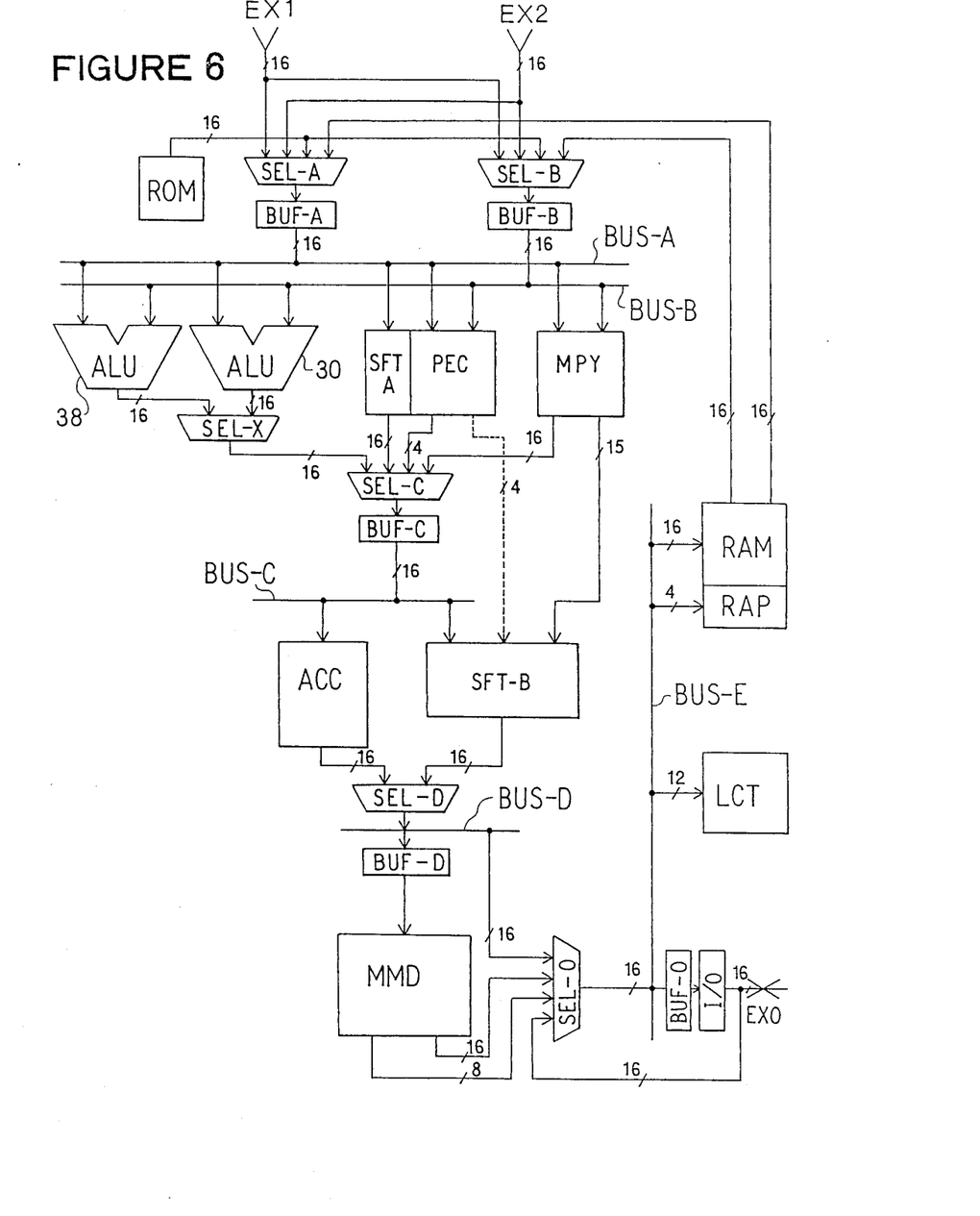
FIG. 6 is a block diagram of a digital signal processor embodying the present invention.

Referring to FIG. 6, there is shown a block diagram of a digital video (image) signal processor formed on a single semiconductor chip, which incorporates therein the circuit shown in FIG. 5.

A pair of 16-bit input ports EX1 and EX2 are coupled to a pair of selectors SEL-A and SEL-B, which are also coupled to the same 16-bit output line of a read only memory ROM and different 16-bit output lines of a random access memory RAM associated with an address pointer RAP.

Outputs of the selectors SEL-A and SEL-B are connected through buffers BUF-A and BUF-B to internal buses BUS-A an BUS-B, respectively. To these buses BUS-A and BUS-B are coupled the main ALU 30, the sub-ALU 38, a multiplier MPY, a shifter SFT-A, a priority encoder PEC associated to the shifter to control the amount of shift, etc. The outputs of the ALUs 30 and 38 is connected to a selector SEL-X whose output is coupled to another selector SEL-C. The selector SEL-C is connected to the output of the shifter SFT-A, the output of the priority encoder PEC which is indicative of the shift amount, and the fraction or mantissa portion of the output of the multiplier MPY. The output of the selector SEL-C is coupled through a buffer BUF-C to an internal bus BUS-C.

To the bus BUS-C is coupled an accumulator ACC and a shifter SFT-B which performs the shift-back corresponding to the shift made by the shifter SFT-A. This shifter SFT-B is also coupled to the exponent portion of the output of the multiplier MPY. The output of the accumulator ACC and the shifter SFT-B are coupled to a selector SEL-D whose output is coupled to an internal bus BUS-D.

To the bus BUS-D is connected to a maximum-minimum detector MMD through a buffer BUF-D. The output of this MMP is connected to a selector SEL-O which is also coupled to the bus BUS-D and an output port EX0. The selector SEL-O has an output coupled to an internal bus BUS-E which is coupled to the RAM, the RAP, a loop counter LCT and an output buffer BUF-O.

The digital video (image) signal processor as mentioned above operates to process the input signals in accordance with programs stored in the ROM. But, since the operations of the above mentioned elements are known to persons skilled in the art, explanation will be omitted.

Figure 7:
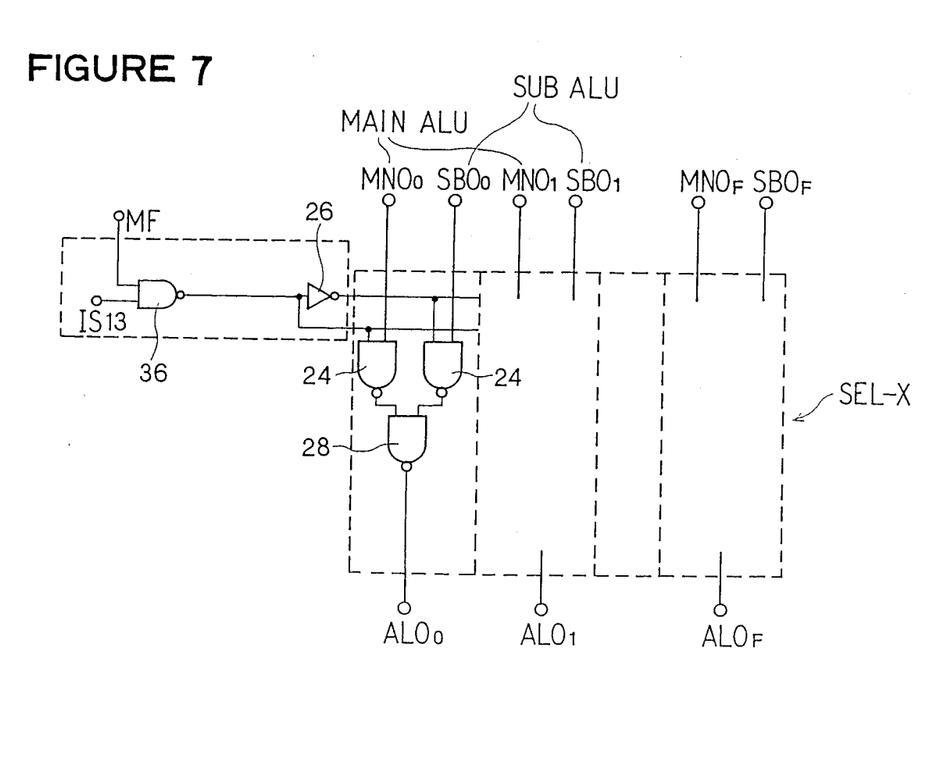
FIG. 7 is a circuit diagram of a selector circuit associated to a pair of arithmetic and logic circuits in the digital signal processor shown in FIG. 6.

FIG. 7 shows the construction of the selector SEL-X shown in FIG. 6. This selector SEL-X has the same construction of the selector circuit shown in FIG. 4 except that the input connection of the NAND gate 36 is different between FIGS. 4 and 7.

Figure 8:
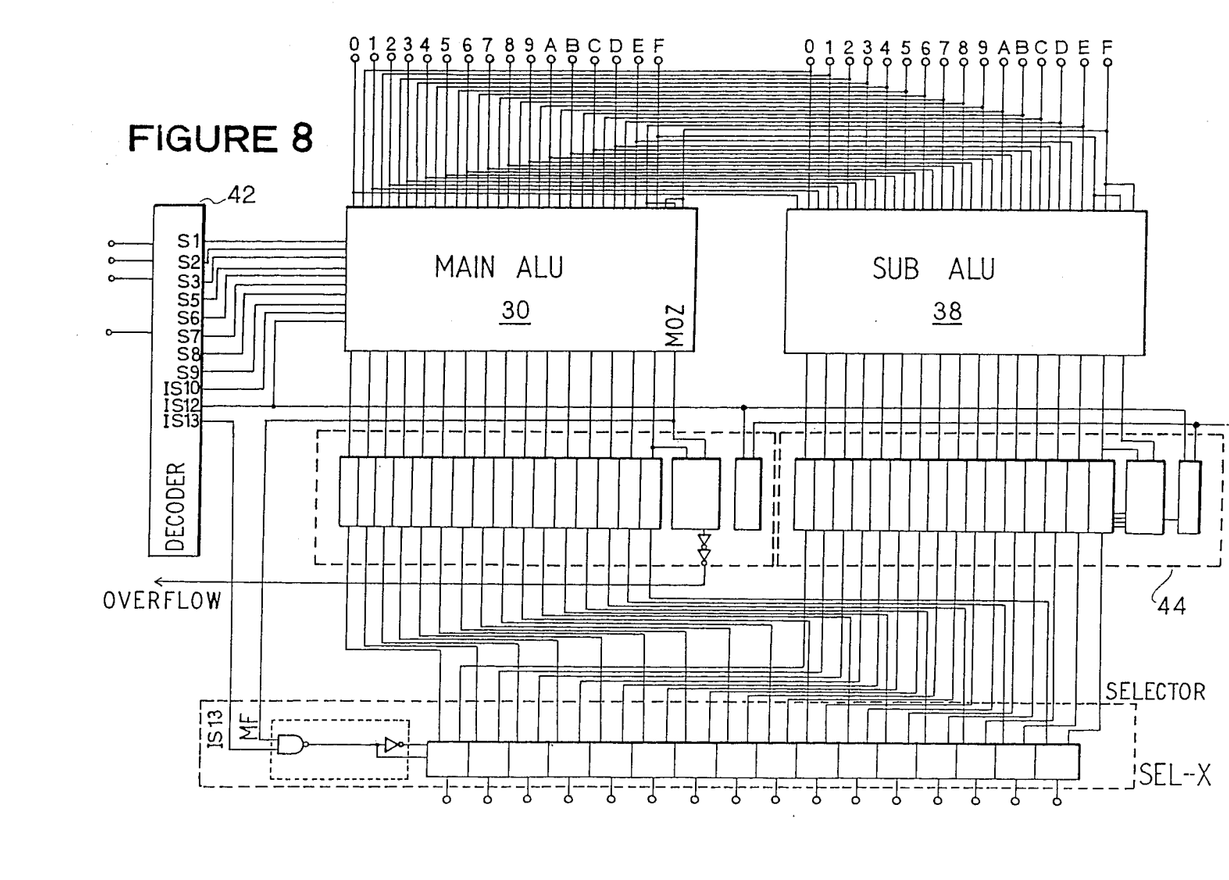
FIG. 8 is a block diagram of the pair of arithmetic and logic circuits and the associated output selector circuit shown in FIG. 6.

FIG. 8 is a block diagram of the ALUs 30 and 38 and the associated circuits. Namely, the ALUs 30 and 38 are adapted to receive two sets of 16 bit lines, 0, 1, ... F and 0, 1, ... F and are controlled by a decoder 42. The outputs of each ALU are connected through an overflow controller 44 to the selector SEL-X.

The NAN gate 36 shown in FIG. 7 includes one input MF connected to a borrow terminal MOZ of the main ALU 30 and the other input connected to a mode control signal terminal IS13 of the decoder 42.

With the above arrangement, when the absolute value operation is executed, the control signal IS13 is brought into "1", so that the main ALU 30 and the sub-ALU 38 are alternatively selected on the basis of the value of the borrow signal on the terminal MOZ of the main ALU 30. Namely, when the borrow signal on the terminal MOZ is "1", the input of the inverter 26 becomes "0", and therefore, the output of the NAND gate 24 is fixed to "1" and the output of the sub-ALU 38 is passed through the selector SEL-X. On the other hand, if the borrow signal on the terminal MOZ is "0", the output of the inverter 26 becomes "0", and so, the output of the main ALU 30 is outputted through the selector SEL-X.

As seen from the description in connection with the circuit shown in FIG. 4, when the control signal IS13 is "0", the output of the main ALU 30 is selected irrespectively of the level of the borrow signal MOZ.

The invention has thus been shown and described with reference to specific embodiments. However, it should be noted that the invention is in no way limited to the details of the illustrated structures but changes and modifications may be made within the scope of the appended claims.

We claim:

1. An arithmetic circuit comprising:
   an arithmetic and logic circuit receiving first and second input signals each of which are composed of a plurality of bits, the arithmetic and logic circuit being capable of outputting a first output signal representative of the first input signal minus the second input signal,
   a subtracter receiving the first and second input signals so as to output a second output signal representative of the second input signal minus the first input signals, and
   selection means receiving the first and second output signals, the selection means operating to output the output signal from the arithmetic and logic circuit when it is in a normal arithmetic and logical operation, said selection means also responding to a predetermined one of the first and second output signals so as to alternatively output the output of the arithmetic and logic circuit and the output of the subtracter when the arithmetic and logic circuit is in the subtraction when the arithmetic and logic circuit is in the subtraction operation for calculation of an absolute value of a difference between first and second input signals.

2. An arithmetic circuit claimed in claim 1 wherein in the case of the operation for the absolute value of the difference between first and second input signals, the selection means is responsive to the output signal of the arithmetic and logic circuit so as to output the output signal of the arithmetic and logic circuit when the output signal of the arithmetic and logic circuit is positive and to output the output signal of the subtracter when the output signal of the arithmetic and logic circuit is negative.

3. An arithmetic circuit claimed in claim 2 wherein the selection means is responsive to a borrow signal of the arithmetic and logic circuit.

4. An arithmetic circuit claimed in claim 1 wherein the selection means includes unitary selection circuits of the number corresponding to the bit number of the first and second output signals, each of the unitary selection circuits having a first NAND gate having a first input connected to receive one corresponding bit of the first output signal and a second input connected to receive an output of a NAND circuit which receives at its first input the most significant bit of the first output signal and at its second input a mode control signal, a second NAND gate having a first input connected to receive one corresponding bit of the second output signal and a second input connected to receive through an inverter an output of the NAND circuit, and a third NAND gate having a first input connected to receive an output of the first NAND gate and a second input connected to receive an output of the second NAND gate for outputting a corresponding bit of the signal representative of the absolute value of the difference between first and second input signals.

5. An arithmetic circuit comprising:
a first arithmetic and logic circuit receiving first and second input signals each of which are composed of a plurality of bits, the first arithmetic and logic circuit being capable of executing an arithmetic and logical operation including a subtraction and also capable of outputting a first output signal representative of the first input signal minus the second input signal,
a second arithmetic and logic circuit receiving the first and second input signals, the second arithmetic and logic circuit being capable of executing an arithmetic and logical operation including a subtraction and also capable of outputting a second output signal representative of the second input signal minus the first input signal, and
selection means receiving the first and second output signals, the selection means operating to output the output signal from the first arithmetic and logic unit when it is in a normal arithmetic and logical operation, said selection means also responding to a predetermined one of the first and second output signals so as to alternatively output the outputs of the first and second arithmetic and logic circuits when the arithmetic and logic circuits are in the subtraction operation for calculation of an absolute value of the difference between first and second input signals.

6. An arithmetic circuit claimed in claim 5 wherein in the case of the operation for the absolute value of the difference between first and second input signals, the selection means is responsive to the output signal of the first arithmetic and logic circuit so as to output the output signal of the first arithmetic and logic circuit when the output signal of the first arithmetic and logic circuit is positive and to output the output signal of the second arithmetic and logic circuit when the output signal of the first arithmetic and logic circuit is negative.

7. An arithmetic circuit claimed in claim 6 wherein the selection means is responsive to a borrow signal of the first arithmetic and logic circuit.

8. A digital signal processor comprising:
first and second arithmetic and logic circuits each of which receives first and second input signals which are composed of a plurality of bits, the first and second arithmetic and logic circuits being such that when the processor is in a first operation mode for an arithmetic and logical operation excluding at least a calculation of an absolute value of a difference between first and second input signals, the first and second arithmetic and logic circuits simultaneously and repeatedly execute the same designated operation until respective outputs of the first and second arithmetic and logic circuit become the same and when the processor is in a second operation mode for calculation of an absolute value of a difference between first and second input signals, the first and second arithmetic and logic circuits simultaneously execute a first subtraction of the first input signal minus the second input signal and a second subtraction of the second input signal minus the first input signal, respectively,
a comparator receiving and comparing the outputs of the first and second arithmetic and logic circuits and operative in the first operation mode to generate, when both the outputs are not equal, an inconsistent signal which causes the first and second arithmetic and logic circuits to repeat the above same given operation until both the outputs are equal, and
a selector circuit receiving the outputs of the first and second arithmetic and logic circuits and operative to output a given one of the outputs of the first and second arithmetic and logic circuits in the first operation mode, the selector circuit being operative in the second operation mode to output either of the outputs of the first and second arithmetic and logic circuits in accordance with a selected one of the outputs of the first and second arithmetic and logic circuits.

9. A digital signal processor comprising:
first and second arithmetic and logic circuits each of which receiving first and second input signals which are composed of a plurality of bits, the first and second arithmetic and logic circuits being such that when the processor is in a first operation mode for an arithmetic and logical operation excluding at least a calculation of an absolute value of a difference between first and second input signals, the first and second arithmetic and logic circuits simultaneously and repeatedly execute the same designated operation until respective outputs of the first and second arithmetic and logic circuits become the same and when the processor is in a second operation mode for calculation of an absolute value of a difference between first and second input signals, the first arithmetic and logic circuit executes a first subtraction of the first input signal minus the second input signal and the second arithmetic and logic circuit executes a second subtraction of the second input signal minus the first input signal,
a comparator receiving and comparing the outputs of the first and second arithmetic and logic circuits and operative in the first operation mode to generate when both the outputs are not equal, an inconsistent signal which causes the first and second arithmetic and logic circuits to repeat the above same given operation until both the outputs are equal, and
a selector circuit receiving the outputs of the first and second arithmetic and logic circuits and operative to output a given one of the outputs of the first and second arithmetic and logic circuits in the first operation mode, the selector circuit being operative in the second operation mode to output either of the outputs of the first and second arithmetic and logic circuits in accordance with a selected one of the outputs of the first and second arithmetic and logic circuits, wherein in the case of the operation for an absolute value of the difference between first and second input signals, the selection means is responsive to the output signal of the first arithmetic and logic circuit so as to output the output signal of the first arithmetic and logic circuit when the output signal of the first arithmetic and logic circuit is positive and to output the output signal of the second arithmetic and logic circuit when the output signal of the first arithmetic and logic circuit is negative.

10. A processor claimed in claim 9 wherein the selection means is responsive to a borrow signal of the first arithmetic and logic circuit.

11. A digital signal processor claimed in claim 9 wherein the selection means includes unitary selection circuits of the number corresponding to the bit number of the first and second output signals, each of the unitary selection circuits having a first NAND gate having a first input connected to receive one corresponding bit of the first output signal and a second input connected to receive an output of a NAND circuit which receives at its first input a borrow signal of the first arithmetic and logic circuit and at its second input a mode control signal, a second NAND gate having a first input connected to receive one corresponding bit of the second output signal and a second input connected to receive through an inverter an output of the NAND circuit, and a third NAND gate having a first input connected to receive an output of the first NAND gate and a second input connected to receive an output of the second NAND gate for outputting a corresponding bit of the signal representative of the absolute value of the difference between first and second input signals.

12. An arithmetic circuit comprising:

first means receiving first and second input signals each of which are composed of a plurality of bits, the first means being operative to output a first output signal representative of the first input signal minus the second input signal, second means receiving the first and second input signals so as to output a second output signal representative of a second input signal minus the first input signal, and selection means receiving the first and second output signals and responsive to one of the first and second output signals so as to alternately output the first and second output signals whereby an absolute value of a difference between first and second input signals is outputted from the selection means, wherein the selection means includes unitary selection circuits of the number corresponding to the bit number of the first and second output signals, each of the unitary selection circuits having a first NAND gate having a first input connected to receive one corresponding bit of the first output signal and a second input connected to receive through an inverter the most significant bit of the first output signal, a second NAND gate having a first input connected to receive one corresponding bit of the second output signal and a second input connected to directly receive the most significant bit of the first output signal, and a third NAND gate having a first input connected to receive an output of the first NAND gate and a second input connected to receive an output of the second NAND gate for outputting a corresponding bit of the signal representative of the absolute value of the difference between first and second input signals.

13. An arithmetic circuit comprising:

first means receiving first and second input signals each of which is composed of a plurality of bits the first means being operative to output a first output signal representative of the first input signal minus the second input signal, second means receiving the first and second input signals so as to output a second output signal representative of the second input signal minus the first input signal, and selection means receiving the first and second output signals and responsive to the most significant bit of the first output signal so as to alternately output one of the first and second output signals which has a positive value;

whereby an absolute value of a difference between first and second input signals is outputted from the selection means, and wherein the first means is an arithmetic and logic circuit which receives the first and second input signals and which can execute an arithmetic and logical operation including a subtraction, and the second means is a subtracter.

14. An arithmetic circuit comprising:

first means receiving first and second input signals each of which is composed of a plurality of bits the first means being operative to output a first output signal representative of the first input signal minus the second input signal, second means receiving the first and second input signals so as to output a second output signal representative of the second input signal minus the first input signal, and selection means receiving the first and second output signals and responsive to the most significant bit of the first output signal so as to alternately output one of the first and second output signals which has a positive value;

whereby an absolute value of a difference between first and second input signals is outputted from the selection means, and wherein the first and second means are first and second arithmetic and logic circuits which receive the first and second input signals and which can execute an arithmetic and logical operation including a subtraction.

* * * * *

UNITED STATES PATENT AND TRADEMARK OFFICE
CERTIFICATE OF CORRECTION

PATENT NO. : 4,849,921

DATED : July 18, 1989

INVENTOR(S) : Yasumoto, et al

It is certified that error appears in the above-identified patent and that said Letters Patent is hereby corrected as shown below:

Column 1, line 42, after "Namely,-" insert --C--,

Column 5, line 48, after "may" insert --be--,

Column 6, line 31, delete "a" and insert --as--,

Column 8, lines 52 and 53, delete "when the arithmetic and logic circuit is in the subtraction".

Signed and Sealed this

Thirty-first Day of July, 1990

*Attest:*

HARRY F. MANBECK, JR.

*Attesting Officer*     *Commissioner of Patents and Trademarks*